(12) United States Patent
Huthmacher

(10) Patent No.: US 11,597,624 B2
(45) Date of Patent: Mar. 7, 2023

(54) METHOD AND DEVICE FOR TEXTURING A SYNTHETIC THREAD

(71) Applicant: Oerlikon Textile GmbH & Co. KG, Remscheid (DE)

(72) Inventor: Jörg Huthmacher, Marl (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 457 days.

(21) Appl. No.: 16/638,702

(22) PCT Filed: Jun. 13, 2018

(86) PCT No.: PCT/EP2018/065591
§ 371 (c)(1),
(2) Date: Feb. 12, 2020

(87) PCT Pub. No.: WO2019/037919
PCT Pub. Date: Feb. 28, 2019

(65) Prior Publication Data
US 2021/0188590 A1     Jun. 24, 2021

(30) Foreign Application Priority Data

Aug. 23, 2017   (DE) ..................... 10 2017 007 991.9

(51) Int. Cl.
*B65H 59/40*     (2006.01)
*G01L 5/10*      (2020.01)
*B65H 63/06*     (2006.01)

(52) U.S. Cl.
CPC ............. *B65H 59/40* (2013.01); *G01L 5/10* (2013.01); *B65H 63/062* (2013.01);
(Continued)

(58) Field of Classification Search
CPC .. B65H 59/40; B65H 63/062; B65H 2511/52; B65H 2557/65; B65H 2701/31; G01L 5/10
(Continued)

(56) References Cited

U.S. PATENT DOCUMENTS 4,267,554 A * 5/1981 Loepfe ............... B65H 63/0321
226/100
5,682,146 A   10/1997 Neumann
(Continued)

FOREIGN PATENT DOCUMENTS

CN     1107644      8/1995
CN     1328524     12/2001
(Continued)

*Primary Examiner* — Octavia Davis Hollington
(74) *Attorney, Agent, or Firm* — Bainwoodhuang

(57) ABSTRACT

Techniques involve texturing a synthetic thread. The thread is pulled off a feed bobbin, which is connected via the thread end thereof to a beginning of a thread of a reserve bobbin by way of a thread knot. In order to monitor the texturing, a thread tension of the thread is measured and analyzed in a measuring point. Additionally, measuring signals of the thread tension are analyzed at the measuring point using a machine learning program, in order to identify the thread knot. To this end, a device has a diagnostic unit, which interacts with the thread tension measuring device in such a way that the measuring signals of the thread tension can be analyzed by way of a machine learning program for identifying a thread knot.

15 Claims, 5 Drawing Sheets

Figure 1:
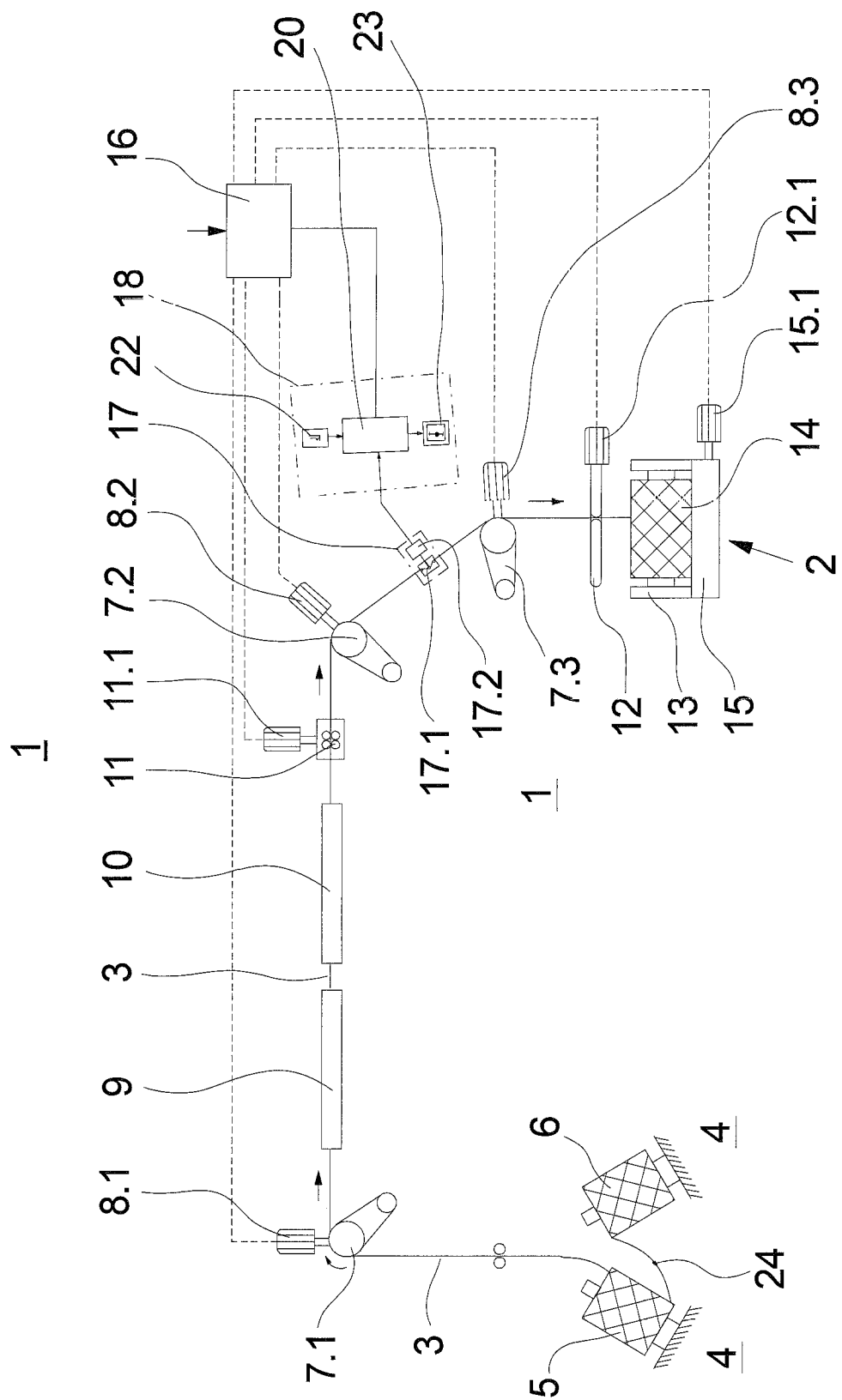

(52) U.S. Cl.
CPC ...... *B65H 2511/52* (2013.01); *B65H 2557/65* (2013.01); *B65H 2701/31* (2013.01)

(58) Field of Classification Search
USPC .......................................................... 139/194
See application file for complete search history.

(56) References Cited

U.S. PATENT DOCUMENTS

| | | | |
|---|---|---|---|
| 6,536,087 B2 * | 3/2003 | Stuttem | B65H 63/086 |
| | | | 28/248 |
| 7,204,137 B1 * | 4/2007 | Skalchunes | D05B 69/36 |
| | | | 73/159 |
| 2001/0037545 A1 | 11/2001 | Stuttem | |
| 2021/0122604 A1 * | 4/2021 | Huthmacher | B65H 63/02 |

FOREIGN PATENT DOCUMENTS

| | | | |
|---|---|---|---|
| DE | 102004026859 | 12/2005 | |
| EP | 1144295 | 10/2001 | |
| EP | 1520826 A1 * | 4/2005 | ........... B65H 59/005 |
| EP | 1707656 A1 * | 10/2006 | ............. D02H 13/24 |
| WO | 0021866 | 4/2000 | |
| WO | 0060506 | 10/2000 | |
| WO | 2017072683 | 5/2017 | |

\* cited by examiner

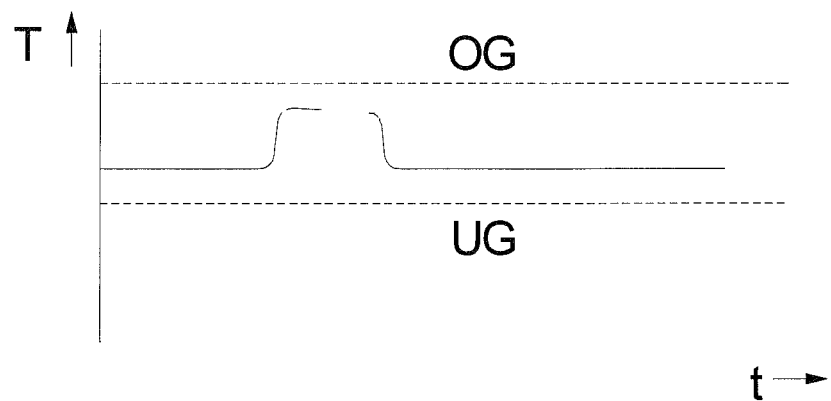
Fig.3.1
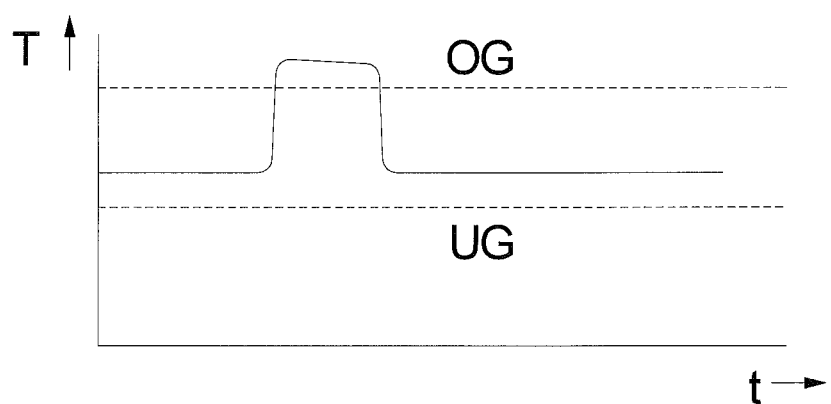
Fig.3.2

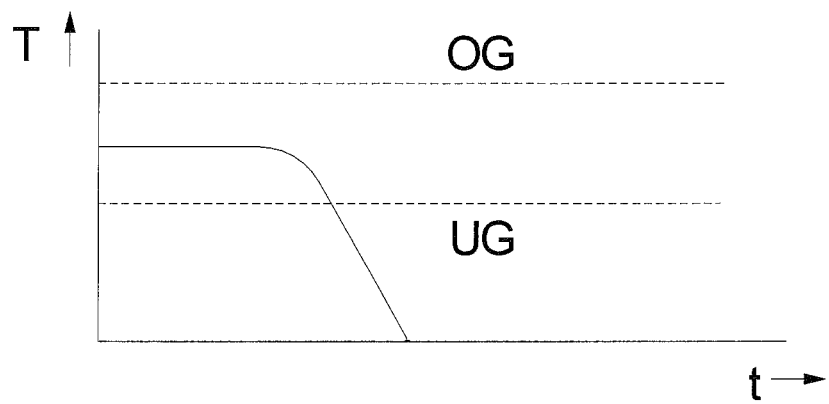
Fig.5.1
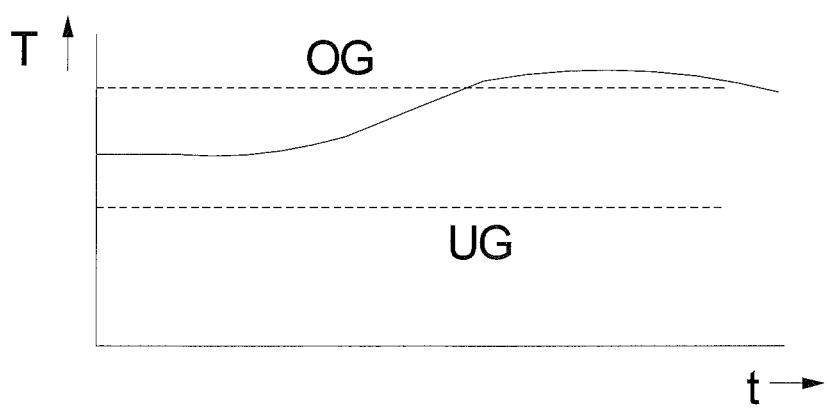
Fig.5.2

METHOD AND DEVICE FOR TEXTURING A SYNTHETIC THREAD

The invention relates to a method for texturing a synthetic thread as disclosed herein and to a device for texturing a synthetic thread as disclosed herein.

A generic method and a generic device for texturing a synthetic thread are known from EP 1 144 295 B1.

In order to finish synthetic threads which, during melt spinning, are formed from a multiplicity of fine filaments, it is generally known to texture the synthetic threads in a following process. The filaments of the thread receive crimping, so that the synthetic threads are given a lofted structure and are thus particularly suitable for textile applications. In the texturing process, these threads are drawn off bobbins, which have previously been produced in a melt spinning process. In order to be able to operate the process continuously, it is usual practice to knot a thread end of a supply bobbin with a thread start of a reserve bobbin. Thread knots of this type constitute a disruptive point in the textured thread, however, which leads to undesired defects in the fabric, in particular during further processing.

In the known method and in the known device, a sensor device is therefore arranged in a thread section between the supply bobbin and the reserve bobbin, which signals the transition of the thread knot in the process. For this purpose, however, it is necessary that an operator introduces the corresponding thread section into the sensor device when connecting the supply bobbin to the reserve bobbin. In addition to the additional operating effort, there is also the danger here that the insertion of the thread section into the sensor device is simply forgotten by the operator.

Although it is also known that such thread knots lead to an undesired measured value change during the monitoring of the thread tension in the texturing process, it has been determined here that the measured value fluctuations caused by thread knots to some extent lie below predefined threshold values and are thus not detected.

It is therefore an object of the invention to improve the generic method and the generic device for texturing a synthetic thread with the effect that each thread knot in the thread run is reliably identifiable without additional operating effort.

According to the invention, this object is achieved by a method having the features as as disclosed herein and by a device having the features as disclosed herein.

Advantageous developments of the invention are defined by the features and feature combinations as disclosed herein.

The invention is based on the finding that the measured value changes of the thread tension occurring over time on account of a thread knot in the course of the thread tension result in typical dependences between the individual measured signals. Here, the dependence of the measured signals in relation to one another on account of a thread knot occurs independently of a threshold value of the thread tension. Thus, by means of analyzing the measured signal changes, typical features for the identification of a thread knot can be derived therefrom. For this purpose, according to the invention, the measured signals are analyzed by a machine learning program. The machine learning program permits rapid and complex analysis of a multiplicity of measured signals, so that their dependences relative to one another can be analyzed quickly, in particular at time intervals, and thus a thread knot is reliably and rapidly identifiable.

Here, the method variant has proven to be particularly advantageous in which a chronological sequence of measured signals of the thread tension is detected as an analysis graph and analyzed.

In order in particular to be able to treat the permissible changes of the thread tension in a differentiated manner from impermissible changes of the thread tensions which exceed a predefined threshold value, the method variant has proven to be particularly advantageous in which a chronological sequence of measured signals of the thread tension when a threshold value of the thread tension is overshot is detected as a fault graph and analyzed. The threshold value can, for example, also comprise a tolerance range owing to the presence of an upper limiting value and a lower limiting value of the thread tension.

Because of a multiplicity of measured signals which are present continuously for analysis, the method variant has proven to be particularly worthwhile in which the analysis of the measured signals of the thread tension is carried out by at least one machine learning algorithm of the machine learning program. Thus, artificial intelligence can be used to carry out a structured analysis even in the case of a large quantity of data and to carry out the identification of the thread knot in the shortest analysis times. However, it is not necessary for this purpose that the machine learning algorithm initially falls back on determined base data for the learning. To this end, for example at the start of a process, analyzed analysis graphs and analyzed fault graphs are transferred to the machine learning algorithm to be learned.

Following a learning phase, it is possible that the machine learning algorithm automatically carries out an unambiguous identification of the thread knot by means of analysis of the measured signals or analysis graphs or fault graphs.

Since, in a texturing process, in addition to the thread knot, further faults which lead to the threshold value of the thread tension being overshot can also occur, the development of the invention is preferably carried out in which the fault graphs are assigned to multiple fault graph categories, wherein the thread knot is one of the fault graph categories. Thus, by expanding the machine learning algorithm, a supplementary assignment of the fault graphs to a fault graph category can be carried out.

In order to be able to bring about a specific diagnosis and, above all, a rapid process change, the method variant is particularly advantageous in which each of the fault graph categories is assigned to a specific process fault and/or specific operating error and/or a specific interfering parameter and/or a specific product fault. Therefore, following assignment of the fault graphs, the basic cause of the thread tension deviation can immediately be eliminated. Thus, in particular during the production of the threads, relatively high quantities of waste can be avoided.

To automate the respective texturing process, the method variant is provided in which, following identification of the thread knot or following the assignment of the fault graph to one of the fault graph categories, a control command relating to a process change is triggered. The process change could, for example, be an early bobbin change, in order to avoid a thread knot being wound in. Alternatively, however, there is also the possibility of giving the operator a specific operating instruction via a signal generation.

The device according to the invention for texturing a synthetic thread achieves the object in that the thread tension measuring device cooperates directly with a diagnostic unit in such a way that the measured signals of the thread tension can be analyzed by a machine learning program to identify a thread knot. Thus, the measured signals of the thread tension in the texturing process can be used directly for an identification of the thread knot.

The diagnostic unit has at least one programmable learning processor for executing the machine learning program. The learning processor can be coupled directly to the thread tension measuring device.

To optimize the machine learning program and to improve the diagnostic reliability, it is further provided for the learning processor to be coupled to an input unit, by means of which one or more determined analysis graphs or fault graphs can be read. Thus, in particular for learning, typical analysis graphs of thread knots are supplied to the machine learning program.

In order that an operator is informed about the respective process run during the process execution, provision is further made for the learning processor to be coupled to an output unit, by means of which an identification of a thread knot or an assignment of the analyzed fault graphs to a fault graph category can be visualized. This output unit can advantageously be coupled wirelessly to the learning processor and represent any type of device on which a display is possible.

In order to obtain a system for diagnosis which is as autonomous as possible, provision is further made for the learning processor to have a neural network for executing the machine learning program. Thus, the large quantities of data can be analyzed continuously during the thread tension measurement.

In order to monitor multiple processing stations in a texturing machine, the device according to the invention can advantageously be used in the development in which the learning processor is arranged physically separately from the input unit and the output unit. Here, there is the possibility that the learning processor is in contact with multiple input units and in particular with multiple output units. The connection is then preferably carried out wirelessly, so that the learning processor could also be formed in a virtual space.

For the purpose of automation, use is advantageously made of the device variant according to the invention in which the diagnostic unit is connected to a machine control unit, by means of which a control command relating to the process change can be carried out. Thus, following identification of a thread knot, appropriate measures could be taken in order to incorporate said thread knot at the start or at the end of a wound bobbin.

The method according to the invention for texturing a synthetic thread will be explained in more detail below using an exemplary embodiment of the device according to the invention, with reference to the appended figures.

Figure 2:
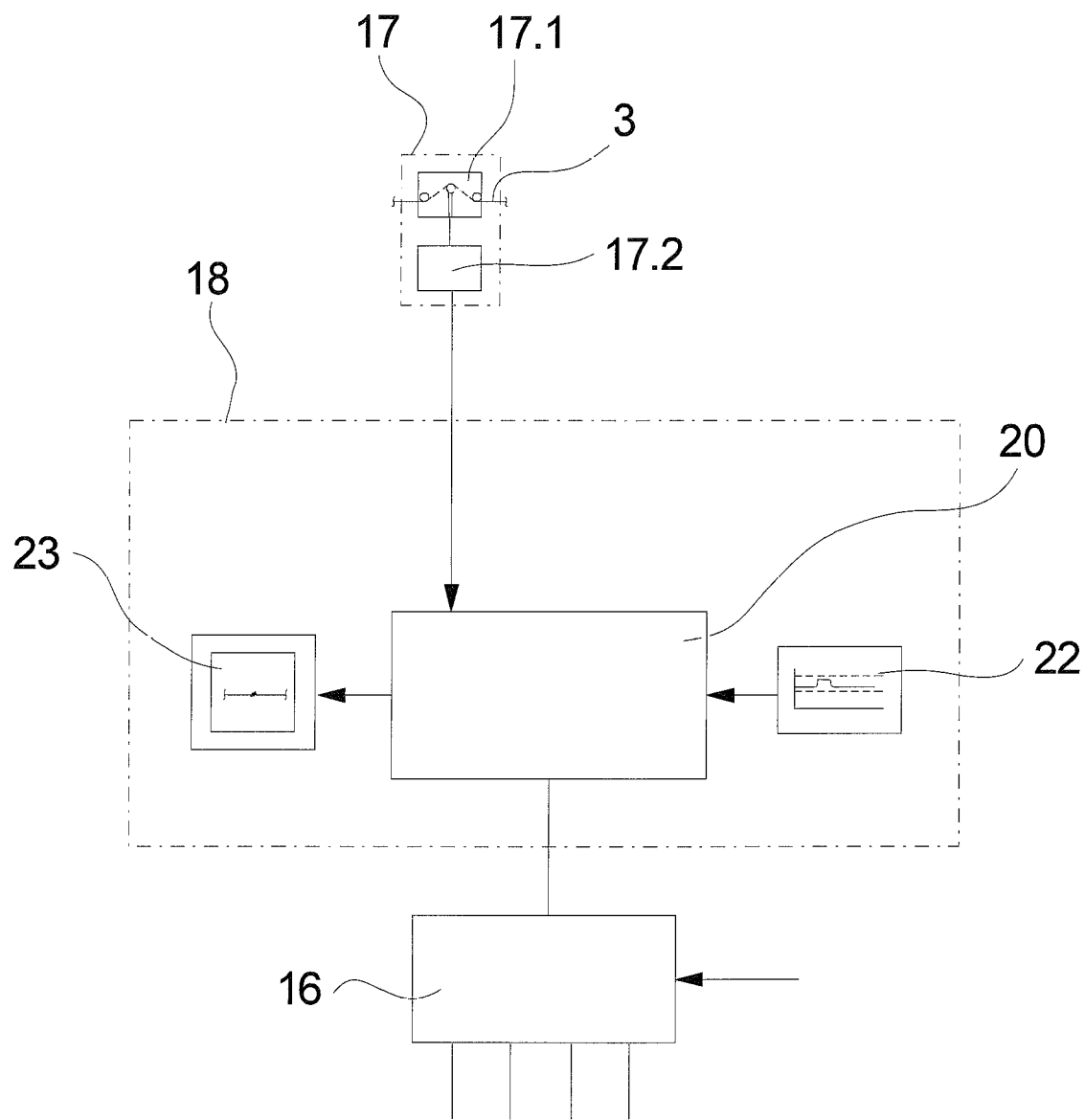

In the figures, in each case schematically:

FIG. 1 shows an exemplary embodiment of the device according to the invention for texturing a synthetic thread FIG. 2 shows a possible structure of a diagnostic unit of the exemplary embodiment of the device according to the invention from FIG. 1

Figure 4:
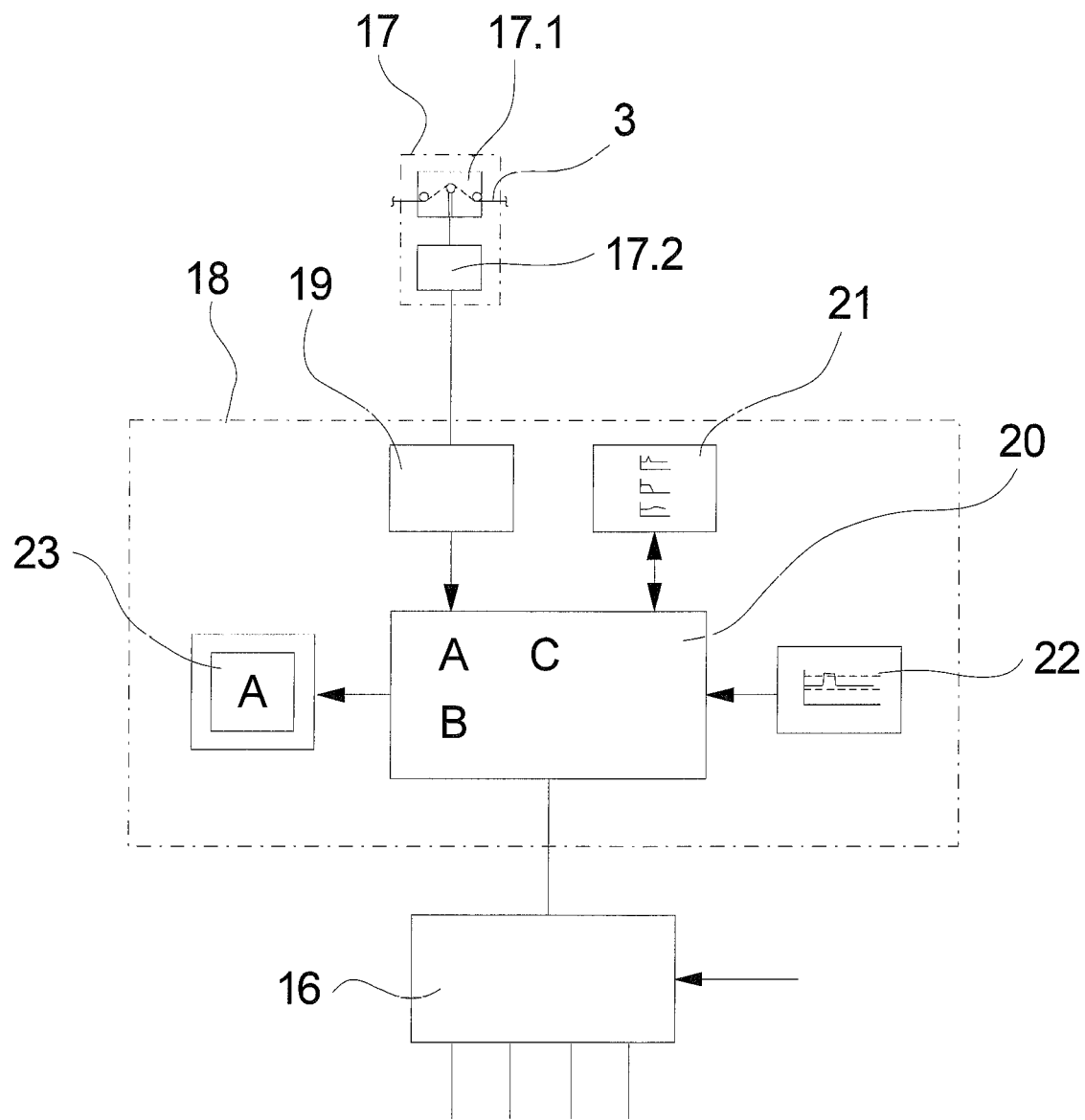

FIG. 3.1 shows an analysis graph with a time sequence of multiple measured signals of a thread tension in the event of a thread knot FIG. 3.2 shows a fault graph with a time sequence of multiple measured signals of a thread tension during a thread knot FIG. 4 shows a further exemplary embodiment of a diagnostic unit of the device according to the invention for texturing a synthetic thread FIG. 5.1 shows a fault graph with a time sequence of multiple measured signals of the thread tension of one fault graph category FIG. 5.2 shows a fault graph with a chronological sequence of multiple measured values of the thread tension of another fault graph category In FIG. 1, an exemplary embodiment of the device according to the invention for texturing a synthetic thread is shown schematically. Here, the texturing process is described by a processing station of the device according to the invention. Such devices normally have a multiplicity of processing stations, in order to texture a multiplicity of threads in parallel with one another. In FIG. 1, a processing station 1 and a winding station 2 of a device according to the invention are illustrated schematically. The processing station 1 has a creel 4, in which a supply bobbin 5 and a reserve bobbin 6 are held. The supply bobbin 5 supplies a thread 3, which is transferred into the processing station 1 for stretching and texturing. A thread end of the supply bobbin 5 and a thread start of the reserve bobbin 6 are connected to each other by a thread knot 24. Thus, continuous drawing off of the thread following the ending of the supply bobbin 5 is implemented. The thread end of the reserve bobbin 6 is then connected to the thread start of a new supply bobbin 5.

The thread is drawn off the supply bobbin 5 by a first delivery device 7.1. The delivery device 7.1 is driven via a drive 8.1. The delivery device 7.1 in this exemplary embodiment is formed by a driven godet roll. In the further thread run, a heating device 9, a cooling device 10 and a texturing unit 11 are arranged downstream of the delivery device 7.1. The texturing unit 11 is driven via a texturing drive 11.1. The texturing unit 11 is preferably designed as a friction twist generator, in order to produce a false twist in the thread 3.

To stretch the thread, a second delivery device 7.2, which is driven by the drive 8.2, is arranged downstream of the texturing unit 11. The delivery device 7.2 is identical in structure to the first delivery device 7.1, wherein the second delivery device 7.2 is operated with a higher peripheral speed in order to stretch the thread. Within the processing station 1, the synthetic thread 3 is thus textured and simultaneously stretched. Following the treatment of the thread 3, the latter is led by a third delivery device 7.3 to a winding station 2. The delivery device 7.3 is driven by the drive 8.3.

The winding station 2 has a bobbin holder 13, which carries a bobbin 14. The bobbin holder 13 is pivotable and can be operated manually or automatically to change the bobbin 14. The bobbin holder 13 is assigned a drive roll 15, which is driven by a roll drive 15.1. In order to lay the thread on the circumference of the bobbin 15, the winding station 2 is assigned a cross-winding unit 12, which has a driven cross-winding thread guide. The cross-winding thread guide is driven via the cross-winding drive 12.1 for this purpose.

The cross-winding drive 12.1 and the roll drive 15.1 of the winding station 2 are formed as individual drives and connected to a machine control unit 16. Likewise, the drives 8.1, 8.2 and 8.3 of the delivery devices 7.1, 7.2 and 7.3 and the texturing drive 11.1 of the texturing unit 11 of the processing station 1 are designed as individual drives and coupled to the machine control unit 16.

For process monitoring, a thread tension is measured continuously on the running thread 3 in a measuring station between the delivery devices 7.2 and 7.3. For this purpose, a thread tension measuring device 17 is provided, which has a thread tension sensor 17.1 and a measuring signal transducer 17.2. The thread tension measuring device 17 is connected to a diagnostic unit 18. In order to explain the diagnostic unit 18, reference will additionally be made to FIG. 2.

In FIG. 2, the diagnostic unit 18 for analyzing the measured signals of the thread tension is illustrated schematically. In this exemplary embodiment, the diagnostic unit 18 comprises a learning processor 20. The learning processor 20 is connected directly to the measuring signal transducer 17.2 of the thread tension measuring device 17. The learning processor 20 is programmable and preferably has a neural network, in order to execute a machine learning program. The machine learning program comprises at least one machine learning algorithm in order to be able to carry out a comprehensive analysis of the measured signals of the thread tension with artificial intelligence.

The learning processor 20 is assigned an input unit 22 and an output unit 23. In order to be able to initiate possible process changes following an analysis, the diagnostic unit 18 is connected direct via the learning processor 20 to a machine control unit 16. The machine control unit 16 is coupled to the drives and actuators of the process units of the processing station 1.

The connections between the learning processor 20 and the thread tension measuring device 17, the input unit 22 and the output unit 23 can each be made by a respective wired or wireless connection. In particular in the case of a wireless connection, there is the possibility that the individual units do not have to be kept at the same location. Thus, the learning processor 20 is integrated in the diagnostic unit 18. There is also the possibility of arranging the learning processor 20 in a virtual space independently of the input unit 22 and the output unit 23.

In the learning processor 20, the measured signals of the thread tension transmitted by the measuring signal transducer 17.1 are analyzed by the machine learning program. For this purpose, the machine learning program has at least one machine learning algorithm which, with the aid of a neural network, carries out a structured analysis of the measured signals to identify a thread knot. Here, in particular the measured signal changes occurring in a chronological sequence are analyzed in order to cover the typical features for the identification of the thread knot.

FIG. 3.1 shows an exemplary embodiment of a chronological measured signal sequence of the thread tension which was measured as a thread knot ran over the measuring station. The entire course of the measured signals of the thread tension is illustrated here as an analysis graph. The measured signal of the thread tension is compared with an upper limiting value and a lower limiting value. In the analysis graph, the upper limiting value is identified by the identifying letters OG and the lower limiting value by the identifying letters UG. For this purpose, the thread tension T is plotted on the Y axis and the time t on the X axis. In the signal course of the measured signals of the thread tension illustrated in FIG. 3.1, no overshooting of the upper limiting value and no undershooting of the lower limiting value can be seen. To this extent, the signal change of the thread tension caused by the thread knot at the measuring station is in the permissible range. Nevertheless, in the following process, for example in a fabric, the thread knot would represent an impermissible fault. Thus, during the analysis, the time profile of the measured signals is analyzed with regard to the characteristic change in order to identify the thread knot.

In the texturing process, such thread knots in the thread run also lead to thread tension changes, which cause the threshold values to be overshot. To this end, in FIG. 3.2 a further exemplary embodiment of a typical signal profile in the event of a thread knot is illustrated. Since, in this case, an upper limiting value is overshot, there is an impermissible thread tension fluctuation. To this extent, the course of the measured signals of the thread tension is defined as a fault graph in this case. The fault graph thus depicts a signal profile of the thread tension which overshoots or undershoots a threshold value. In this case, too, the upper limiting value is shown with the identifying letters OG, and the lower limiting value with the identifying letters UG as threshold values.

In order to permit a differentiated and in particular an expanded analysis and diagnosis of fault causes, a further exemplary embodiment of a diagnostic unit 18 is illustrated in FIG. 4, as would be usable, for example, in the inventive device according to FIG. 1. In this case, the diagnostic unit 18 comprises a thread tension evaluation unit 19, which is connected directly to the thread tension measuring device 17. Thus, the measured signals from the measuring signal transducer 17.2 are fed to the thread tension evaluation unit 19. Within the thread tension evaluation unit 19, first of all time profiles of the measured signals of the thread tension are recorded and produced as an analysis graph. In parallel, the measured signals are compared with a threshold value. Usually, the measured signal on the thread tension is compared with an upper limiting value and a lower limiting value. As soon as an impermissible tolerance deviation of the thread tension is detected, the short-term measured signal profile of the thread tension is recorded and produced as a fault graph.

Depending on whether an analysis graph without a threshold value overshoot or a fault graph with a threshold value infringement is present, said graph is transferred to a learning processor 20. The learning processor 20 is accordingly adapted in its machine learning algorithm in order to be able to carry out appropriate analyses for identifying the thread knot.

Since the thread tension fluctuations recorded in the measuring station and having threshold value infringement are also caused by other interfering parameters, the machine learning program and in particular the machine learning algorithm are expanded by multiple fault graph categories. Here, a specific process fault and a specific operating error or a specific interfering parameter or a specific product fault which specific operating error or which specific interfering parameter or which specific product fault, in a fault graph, causes a characteristic signal profile of the thread tension, are designated as a fault graph category. To this extent, other fault graphs can also be analyzed in order to find possible faults. Thus, for example, the fault graph illustrated in FIG. 3.2 could define the fault graph category A. The fault graph category A is therefore synonymous with the identification of the thread knot.

As emerges from FIG. 4, the learning processor 20 is assigned a memory unit 21, in which a data pool of fault graphs and fault graph categories is stored. Thus, the machine learning program can be trained and expanded.

In FIGS. 5.1 and 5.2, further typical fault graphs of possible fault graph categories are illustrated. The fault graph illustrated in FIG. 5.1 determines the fault graph category B. The fault graph category B could have its cause in a thread break or an operating error, in which the thread tension completely breaks down suddenly in the measuring station. To this extent, the lower limiting value UG is undershot. The measured signal of the thread tension falls suddenly to a value 0.

The fault graph illustrated in FIG. 5.2 determines the fault graph category C in this exemplary embodiment. The fault graph category could, for example, illustrate a wear situation on one of the process units, for example a cooling rail contacted by the thread. Here, a slow rise in the measured signal of the thread tension until the upper limiting value OG is overshot is determined.

To this extent, each of the fault graph categories A to C is to be assigned to a specific fault. The fault graph categories illustrated in FIGS. 5.1 and 5.2 are merely exemplary. In the texturing process, as is carried out in the inventive device according to FIG. 1, a multiplicity of fault graph categories can occur, on which a unique cause in the process is based. In the diagnostic unit 18 illustrated in FIG. 4, the fault graph provided by the thread tension evaluation unit 19 is analyzed by the machine learning program within the learning processor 20. Here, the fault graph is analyzed with the aid of at least one, preferably multiple, machine learning algorithms. At the end of the analysis, a classification into one of the already learned fault graph categories is carried out.

In the diagnostic units illustrated in FIGS. 2 and 4, it is in each case indicated in the output unit 23 that a thread knot in the thread run has been identified. When the fault graphs are analyzed, the assignment to the fault graph category A is carried out. Thus an operator is informed and can, if appropriate, himself carry out an intervention to change the process.

Alternatively, however, there is also the possibility that a signal is given directly to the machine control unit 16 by the learning processor 20. Therefore, the learning processor 20 is also connected to the machine control unit 16 of the inventive device according to FIG. 1. Thus, for example, during the identification of the thread knot or during the assignment to the fault graph category A, an early bobbin change could be initiated, in order to incorporate the thread knot in the region of the thread start of a bobbin or in the region of a thread end of a bobbin.

The method according to the invention is thus particularly suitable for locating the thread knots in the final bobbins and thus for keeping the same out of a further treatment process in a defined manner. Here, no additional aids are required in order to identify the thread knot in the thread run.

The invention claimed is:

1. A method for texturing a synthetic thread, in which said thread is drawn off a supply bobbin and stretched,
   wherein a thread end of the supply bobbin is connected to a thread start of a reserve bobbin by a thread knot,
   wherein a thread tension of the thread is measured and analyzed continuously in a measuring station in order to monitor the texturing, and
   wherein, in order to identify the thread knot at the measuring station, measured signals of the thread tension are analyzed by a machine learning program.

2. The method as claimed in claim 1, wherein a chronological sequence of measured signals of the thread tension is detected as an analysis graph and analyzed.

3. The method as claimed in claim 1, wherein a chronological sequence of measured signals of the thread tension when a threshold value of the thread tension is overshot is detected as a fault graph and analyzed.

4. The method as claimed in claim 3, wherein analysis of the measured signals of the thread tension is carried out by at least one machine learning algorithm of the machine learning program.

5. The method as claimed in claim 4, wherein the thread knot is identified by the machine learning algorithm from analyzed analysis graphs or analyzed fault graphs.

6. The method as claimed in claim 5, wherein the fault graphs are assigned to multiple fault categories, and wherein the thread knot is one of the fault graph categories.

7. The method as claimed in claim 6, wherein other fault graph categories are assigned to at least one of a specific process fault, a specific operating error, a specific interfering parameter, and a specific product fault.

8. The method as claimed in claim 7, wherein following identification of the thread knot or following the assignment of the fault graph to one of the fault graph categories, a control command relating to a process change is triggered.

9. A device for texturing a synthetic thread, comprising:
   a creel for holding a supply bobbin and a reserve bobbin,
   multiple delivery devices,
   a texturing unit,
   a winding station,
   a thread tension measuring device for measuring a thread tension at a measuring station, and
   a diagnostic unit, wherein the thread tension measuring device cooperates with the diagnostic unit in such a way that measured signals of the thread tension (T) can be analyzed by a machine learning program to identify a thread knot.

10. The device as claimed in claim 9, wherein the diagnostic unit has a programmable learning processor for executing the machine learning program.

11. The device as claimed in claim 10, wherein the learning processor is coupled to an input unit, by means of which one or more determined analysis graphs of the thread tension can be read.

12. The device as claimed in claim 11, wherein the learning processor is coupled to an output unit, by means of which at least one of an identification of the thread knot and an assignment of the analyzed fault graphs to one of the fault graph categories can be visualized.

13. The device as claimed in claim 12, wherein the learning processor has a neural network for executing the machine learning program.

14. The device as claimed in claim 13, wherein the learning processor is separated physically from the input unit and the output unit.

15. The device as claimed in claim 14, wherein the diagnostic unit is connected to a machine control unit, by means of which a control command relating to the process change can be carried out.

* * * * *